United States Patent
Funk, Sr. et al.

[11] Patent Number: 6,070,485
[45] Date of Patent: Jun. 6, 2000

[54] PUSHBUTTON SOLENOID SHIFTER

[76] Inventors: David G. Funk, Sr.; Deborah J. Funk, both of 2556 McClintocksburg Rd., Deerfield, Ohio 44411

[21] Appl. No.: 09/189,877

[22] Filed: Nov. 11, 1998

[51] Int. Cl.[7] .................................................. B60K 17/12
[52] U.S. Cl. ............................................ 74/473.12; 74/335
[58] Field of Search ..................... 74/335, 471 R, 74/473.1, 473.12, 483 PB

[56] References Cited

U.S. PATENT DOCUMENTS

| | | | |
|---|---|---|---|
| Re. 34,064 | 9/1992 | Tury et al. | 74/335 |
| 2,281,159 | 4/1942 | Kliesrath et al. | 192/1 |
| 3,465,577 | 9/1969 | Donovan . | |
| 3,687,248 | 8/1972 | Holub | 192/3.54 |
| 3,713,332 | 1/1973 | Herrbrich | 73/117 |
| 3,894,442 | 7/1975 | Hembree | 74/335 |
| 4,466,279 | 8/1984 | Gable et al. | 73/117 |
| 4,488,455 | 12/1984 | Shetler et al. | 74/851 |
| 5,068,583 | 11/1991 | Gresham et al. | 318/266 |
| 5,172,603 | 12/1992 | MacInnis | 74/335 |
| 5,197,344 | 3/1993 | Maier et al. | 74/335 |
| 5,425,686 | 6/1995 | Grange | 477/79 |
| 5,471,894 | 12/1995 | McFadden | 74/336 |
| 5,515,272 | 5/1996 | Sakai etal. | 364/424.1 |

*Primary Examiner*—David M. Fenstermacher
*Attorney, Agent, or Firm*—John D. Gugliotta

[57] ABSTRACT

A solenoid actuated transmission shifting apparatus is provided for temporary or permanent installation in automobiles with conventional, H-pattern-type manual transmissions or automatic transmissions and also for use with motorcycle transmissions. The shifting apparatus allows for both upshifting and downshifting through the transmission gears by pressing pushbuttons mounted on the steering wheel, handlebar or dashboard.

11 Claims, 10 Drawing Sheets

PUSHBUTTON SOLENOID SHIFTER

BACKGROUND OF THE INVENTION

1. Field of the Invention

The present invention relates generally to shifting devices for automatic and manual transmissions used in automobiles, motorcycles and the like, and more specifically to solenoid actuated shifting systems that allow for shifting the transmission by pressing pushbuttons located on the steering wheel or handlebars.

Motor sports teams continually take advantage of modern technological advancements in order to give them a competitive edge over their opponents. In particular, motorcycle drag racers utilize solenoid technology in shifting gears on their manual transmissions. In doing so, the drag racers use a handlebar mounted pushbutton to actuate an electrical or pneumatic solenoid that upshift the gears from the low range through the high range gears. This provides the racer with enhanced control, allowing him to keep his hands on the handlebars and shift without clutching while reaching a maximum speed in the shortest amount of time possible. Due to these limited purposes, the solenoid configuration is designed only to upshift through the gears. While consumer use of these devices would be desirable, especially in the case where one is disabled, has an injury or temporary disability that prevents them from driving, it is impractical due to the aforementioned upshift-only limitations. Furthermore, devices of this nature may be equally desirable in other motor sports, especially in automobile racing circuits. The present invention addresses these problems by providing a solenoid actuated pushbutton shifting device for manual and automatic transmissions that both upshifts and downshifts and can be installed in automobiles and on motorcycles.

The present invention is an add-on, pushbutton actuated, electrical solenoid driven mechanism that is used to upshift and downshift a manual motorcycle or automobile transmission or automatic automobile transmission. The shifter is actuated by a two pushbutton controller, one used to upshift and one used to downshift. The solenoids are wired into and powered by the vehicle's electrical system. An electromechanical or solid state relay, triggered by the pushbuttons, is used to switch the power to the solenoids. In the motorcycle version, two solenoids are mounted in a linearly opposing fashion such that, when actuated, they operate the transmission shifter lever arm in the appropriate direction, either up or down, in order to switch through the transmission gears.

Depending upon the particular type of transmission, the automobile configuration is somewhat more complex requiring a plurality of solenoids to operate due to the typical H-pattern shifting and the presence of a reverse direction gear. For example, a three-speed transmission requires at least three solenoids, a four-speed transmission requires at least four solenoids, etc. The solenoids are arranged, linearly aligned and in an opposing manner, such that when operated in sequence, the required H-pattern shifting is achieved. The control system for the automobile version is also more complex. In this case, several electro-mechanical or solid state relays are required to switch power to the increased number of solenoids. Furthermore, either hard-wired logic or the use of a microprocessor must be incorporated in order to determine the proper shifting pattern by memorizing the current gear position. In either installation, a configuration is available wherein the operator can maintain the option of manually shifting the transmission using the motorcycle foot lever or the automobile shifting handle.

2. Description of the Related Art

In the ancillary art, there are several related devices that describe automation means for both automatic and manual transmissions used in a variety of vehicles ranging from motorcycles to large trucks. Varying widely in usage, these devices are intended for specialized usage in vehicle testing and drag racing as well as for general everyday purposes.

U.S. Pat. No. 5,471,894, issued in the name of McFadden, discloses a shifting method and controller for controlling a shifter in a drag racing vehicle wherein an electronic solenoid is used to actuate the manual hand-operated shift lever that controls the up-shifting of gears. The controller shifts through the gears automatically, by monitoring engine RPMs and other variables. As this device is intended only for drag racing vehicles, it does not permit manual actuation of the shifting apparatus nor does it permit downshifting.

U.S. Pat. No. 3,894,442, issued in the name of Hembree, discloses a motorcycle shifting device that utilizes electronic solenoids to both up-shift and downshift through the transmission gears. Gears are shifted by rotating a spindle which in turn operates a ratchet gear shifting means in the gear box. The spindle is connected to a lever arm that is actuated by the solenoids, which are activated by a pair of control pushbuttons. This device is unnecessarily complicated in the sense that installation requires that the gearbox be disassembled in order to install it, as compared to the present invention that mounts outside the gearbox, actuates the existing shifter lever while allows for traditional actuation by foot.

U.S. Pat. No. 4,488,455, issued in the name of Shetler et al., discloses a manual transmission shifting mechanism for motorcycles that does not require the use of a clutch mechanism to unload the transmission so that the shift can take place. Gear shifting is accomplished through the use of a sensor or limit switch that detects when the manual shifting lever is actuated. When this occurs, electricity to the motor ignition system is cut-off, thus preventing it from generating power, unloading the transmission and allowing the gear shift to take place. This device does not, however, automate or otherwise eliminate the need for the user to manually actuate the shifter lever by foot, it merely eliminates the use of the clutch in shifting gears.

U.S. Pat. No. 2,281,159, issued in the name of Kliesrath et al., discloses an early attempt at an automated shifting apparatus for manual automobile transmissions wherein a pneumatic piston-type actuator, mounted on or near the automobile dash, is used to actuate the transmission lever. The pneumatic actuator is driven by air vacuum drawn by the engine's combustion air intake. The vacuum is isolated from the actuator by a valve mechanism that is operated when the clutch pedal is depressed. When the clutch pedal is depressed, the pneumatic actuator shifts the transmission. Not only is the operation of this device questionable in terms of safety, it is also unnecessarily complicated, requiring extensive disassembly and modification of the automobile.

U.S. Pat. No. 4,466,279, issued in the name of Gable et al., presents a gear shifting mechanism that utilizes an electronic solenoid to both up-shift and downshift through the transmission gears in automobiles equipped with manual transmissions. The gear shifting mechanism attaches directly to the manual gear shift lever in the passenger compartment of the vehicle. The device includes an engine speed monitoring device that determines the appropriate time at which to shift gears, and does so automatically. This device is intended to be used as a means to quickly and efficiently run through the transmission gears while the vehicle is being tested on dynamometer equipment and the like and is not meant for on-road use.

U.S. Pat. No. 3,465,577, issued in the name of Donovan, discloses an apparatus for operating and testing the controls of an automobile or the like. A combination of electronic solenoids, hydraulic pistons and valves as well as a monitoring computer are used to manipulate the vehicle controls while testing the performance of the steering mechanism, the transmission, the brakes and the accelerator. The automated shifting apparatus utilizes both electronic solenoids to both up-shift and downshift through the transmission gears and/or hydraulic actuators to actuate the transmission linkage. This device would not lend well to on-road use due to the fact that the steering wheel, accelerator pedal and brake pedal are encumbered.

U.S. Pat. No. 3,713,332, issued in the name of Herrbrich, presents an apparatus for the automatic operation of an automotive vehicle for testing the performance of the gas and brake pedals, clutch, and gear-shifting lever while the vehicle rests on a roller test stand. The device is of a size and construction such that it is placed inside the passenger compartment of the vehicle and is connected to the aforementioned control devices via a series of quick-connectors. Utilizing a series of servo-motors in conjunction with a computerized control program, the device puts the vehicle through a series of simulated tests during which its performance can be monitored. This device also would not lend well to on-road use due to the fact that the steering wheel, accelerator pedal and brake pedal are encumbered.

U.S. Pat. No. 5,068,583, issued in the name of Gresham et al., discloses an electronic shifter used to monitor and control the gear ratio range commonly found on large trucks and the like and used in conjunction with the transmission in order to maximize the amount of time that the engine works at the optimum speed. By electronically monitoring the current gear range and the engine speed, the device is able to determine and select the proper gear ratio range automatically. This device does not, however, provide a means by which to control shifting of the transmission gears.

U.S. Pat. No. 5,172,603, issued in the name of MacInnis, discloses a shifting system for large trucks and the like that employ the use of a multiple range gear ratios that eliminates the need for multiple knobs or shift levers to select the proper range. The device incorporates a pair of switches on the transmission gear shifter lever that are used to actuate air solenoids that select the gear range. This device also does not provide a means by which to control shifting of the transmission gears.

U.S. Pat. No. Re. 34,064, issued in the name of Tury et al., discloses a solenoid actuated shifting apparatus intended for use with a motor vehicle having an automatic transmission. The device includes a pushbutton control panel that mounts on the vehicle dash, allowing the driver to select the appropriate transmission mode with the push of a button.

While several features exhibited within these references are incorporated into this invention, alone and in combination with other elements, the present invention is sufficiently different so as to make it distinguishable over the prior art. Consequently, a need has been felt for a means by which to eliminate the need to manually actuate the gear shifting lever of a manual transmission of a motorcycle, automobile or other like motor vehicle as well as an automatic automobile transmission.

SUMMARY OF THE INVENTION

Over the years a wide variety of devices have been developed to modify the controls used in the operation of motor vehicles. These motivation behind these devices also varies and includes purposes such as enhancing the performance of racing vehicles to motor vehicle performance testing apparatuses to allowing those with physical handicaps or other disabilities to operate a vehicle without requiring the use of their feet or legs. In racing circuits, these devices are typically used to shift the gears of a manual transmission, usually providing only upshifting capabilities and often involving complex installations and control systems that incorporate the use of sophisticated data acquisition and automated controls electronics. In the performance testing arena, these devices are equally if not more complex, typically bulky, and usually prohibit the vehicle from being used for transportation purposes while in use. Vehicle control adaptations for handicapped drivers are also complex, expensive, are installed permanently and are typically incorporated in vehicles with an automatic rather than a manual transmission.

The present invention addresses situations that would benefit from the adaptation of a manual transmission to automate gear shifting, but until now has been prohibited by the inherent problems associated with each of the aforementioned classes of vehicle control modifications. The motivation behind the present invention lies basically in two areas. First, in the racing arena as well as in everyday usage, many people enjoy the vehicular control and response provided by a manual transmission. However, especially in the racing scenario, they risk their safety and well-being due to the fact that manual transmissions require the use of a free hand to operate which negatively affects the amount of control they have over their vehicle. Second, in the commonly occurring situation where the owner of a vehicle has been injured and temporarily loses availability or has limited use of an arm or hand, it is extremely dangerous to drive their vehicle, if not impossible altogether.

Accordingly, it is an object of the present invention to provide a pushbutton solenoid shifter that incorporates the use of electronic solenoids to actuate the shifting of gears in the manual transmission of an automobile, motorcycle or the like as well as automatic automobile transmissions.

It is another object of the present invention to provide a pushbutton solenoid shifter that both upshifts and downshifts through the gear pattern of a manual transmission.

It is another object of the present invention to provide a pushbutton solenoid shifter that is controlled by a steering wheel or handlebar mounted pushbutton assembly.

It is another object of the present invention to provide a pushbutton solenoid shifter that can be adapted to a variety of manual transmission configurations, including 3, 4, 5, and 6 speed transmissions, including a reverse gear.

It is another object of the present invention to provide a pushbutton solenoid shifter that is adjustable or fine-tunable so as to accommodate the action of varying transmission linkages.

It is another object of the present invention to provide a pushbutton solenoid shifter that attaches directly to the transmission linkage in a permanent configuration.

It is another object of the present invention to provide a pushbutton solenoid shifter that attaches to the manual shifting lever in a temporary fashion in order to accommodate individuals with temporary loss of the use of their hand or arm.

It is another object of the present invention to provide a pushbutton solenoid shifter that attaches to the manual shifting lever in a manner that allows the user to use the manual shifting lever if desired.

It is another object of the present invention to provide a pushbutton solenoid shifter for use with a manual automobile transmission that allows for the manual actuation of the transmission via a conventional shifting lever or the like.

It is another object of the present invention to provide a pushbutton solenoid shifter that attaches to a motorcycle frame, actuating the foot lever to upshift/downshift the transmission while allowing the user to manually actuate the shift lever with his/her foot.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

1. Detailed Description of the Figures

Figure 1:
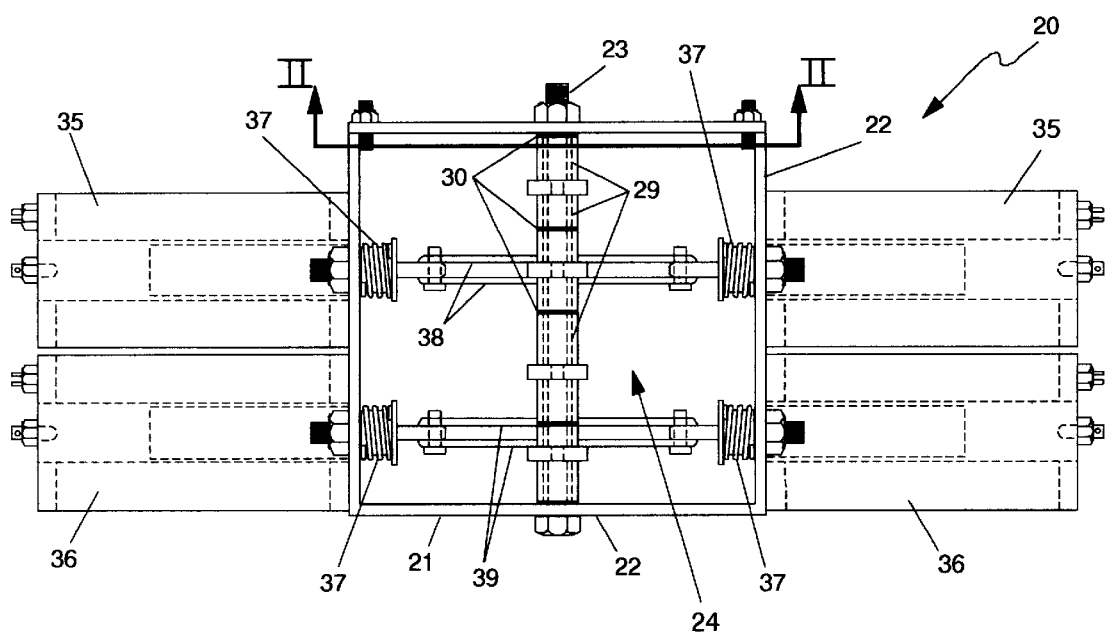
FIG. 1 is a bottom view of a solenoid actuated shifting mechanism for use with a four-speed manual transmission, including a reverse gear.
Figure 2:
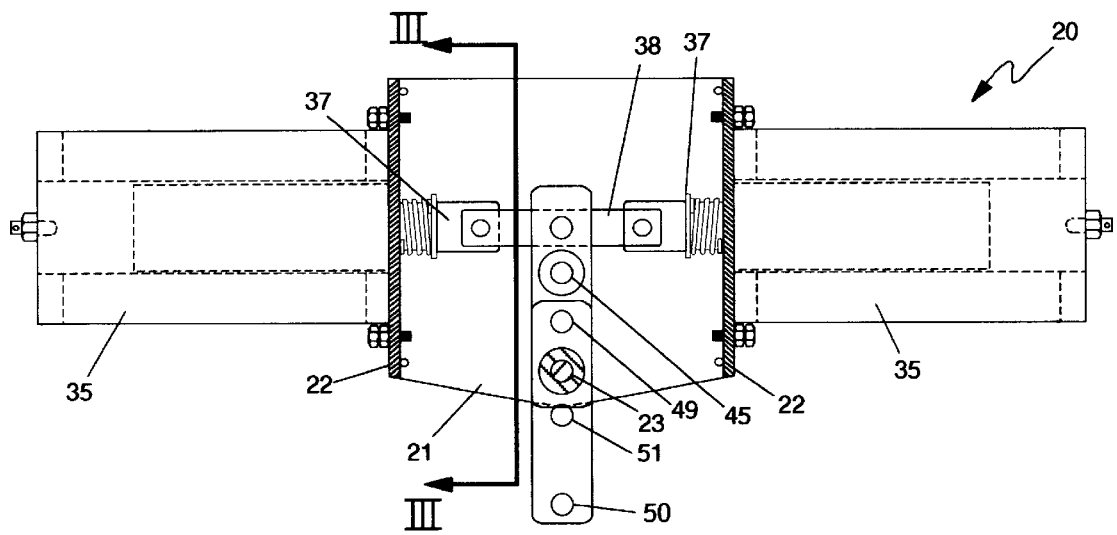
FIG. 2 is a front sectional view, taken along line II—II depicted in FIG. 1, of a solenoid actuated shifting mechanism for use with a four-speed manual transmission, including a reverse gear.
Figure 3:
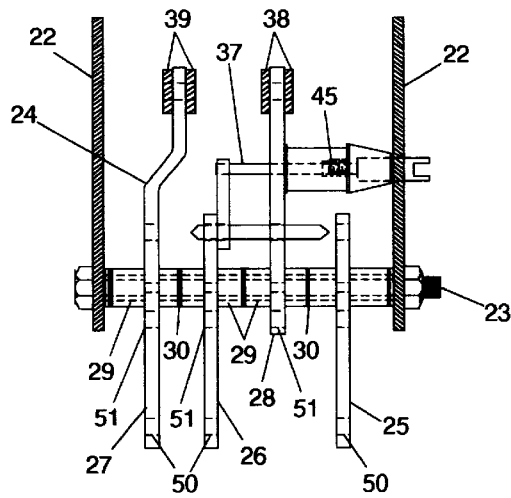
FIG. 3 is a side sectional view, taken along line III—III depicted in FIG. 2, of a solenoid actuated shifting mechanism for use with a four-speed manual transmission, including a reverse gear, depicting the cantilever linkage actuating mechanism thereof.

Referring now to FIGS. 1–3, depicted is a solenoid actuated shifting mechanism for use with a four-speed manual transmission, including a reverse gear, hereinafter four-speed shifter 20, according to the preferred embodiment of the present invention. The construction of this particular embodiment is designed with the intent being to provide a permanent modification, installing a pushbutton controlled, solenoid actuated shifting mechanism that does not permit the user to manually actuate the transmission linkage via a shifting lever or the like. The four-speed shifter 20 consists of a shifter housing 21, to which the various shifting components, discussed in further detail herein below, are attached and that is designed to be secured to the linkage housing of a four-speed manual transmission (not shown). The shifter housing 21 is generally rectangular in shape with two pairs of housing sidewalls 22 opposing one another and forming a hollow interior cavity therein. A linkage lever support rod 23 spans the interior cavity of the shifter housing 21 and is connected thereto, centered along one pair of the sidewalls 22 and forming the foundation upon which a four-speed linkage assembly 24 is built. The four-speed linkage assembly 24 consists of a first/second gear linkage lever 25, a third/fourth gear linkage lever 26, a reverse gear linkage lever 27, and a range selection drive lever 28, rotatably attached to the linkage lever support rod 23 in a manner so as to allow them to rotate about the longitudinal axis of the linkage lever support rod 23. The first/second gear linkage lever 25, third/fourth gear linkage lever 26, and the reverse gear linkage lever 27 are positioned such that the end portions thereof protrude from the shifter housing 21. The first/second gear linkage lever 25, third/fourth gear linkage lever 26, the reverse gear linkage lever 27, and the range selection drive lever 28 are separated and spaced along the linkage lever support rod 23 using a series of metal bushings and O-rings, constructed of TEFLON® or other like friction-reducing substance.

A pair of drive gear solenoids 35 and a pair of reverse gear solenoids 36 are attached to the housing sidewalls 22 in an opposing manner with the solenoid plungers 37 directed towards the interior cavity of the shifter housing 21. The drive gear solenoids 35 and the reverse gear solenoids 36 are positioned above the longitudinal axis of the linkage lever support rod 23 and operate in a direction parallel to the rotational axis of the first/second gear linkage lever 25, third/fourth gear linkage lever 26, reverse gear linkage lever 27, and the range selection drive lever 28. The solenoid plungers 37 of the drive gear solenoids 35 are connected to one another by a pair of drive solenoid linkage brackets 38 and the solenoid plungers 37 of the reverse gear solenoids 36 are connected to one another by a pair of reverse solenoid linkage brackets 39. The drive solenoid linkage bracket 38 is pivotally connected, at its midpoint, to the range selection drive lever 28 and reverse solenoid linkage bracket 39 is pivotally connected, at its midpoint, the reverse gear linkage lever 27. Configured as such, the actuation of the drive gear solenoids 35 and the reverse gear solenoids 36 will cause the actuation of the range selection drive lever 28 and the reverse gear linkage lever 27, respectively, in an axial direction about the linkage lever support rod 23. The drive solenoid linkage brackets 38 and the reverse solenoid linkage brackets 39 are pivotally connected to the solenoid plungers 37, in order to take into account the vertical component of the axial motion of the range selection drive lever 28 and the reverse gear linkage lever 27, respectively.

A range selection solenoid 45 is secured to the range selection drive lever 28, at a position between the linkage lever support rod 23 and the drive solenoid linkage brackets 38, oriented such that its solenoid plunger 37 actuates in a direction perpendicular to that of the drive gear solenoids 35 and the reverse gear solenoids 36 and parallel to the longitudinal axis of the linkage lever support rod 23. The solenoid plunger 37 of the range selection solenoid 45 is connected to a range selection pin mechanism 46 in a manner such that the range selection pin 47, attached thereto, is actuated in a direction parallel to the longitudinal axis thereof, which coincides with and is parallel to that of the solenoid plunger 37 of the range selection solenoid 45. The first/second gear linkage lever 25, the third/fourth gear linkage lever 26, and the range selection drive lever 28 each have a range selection pin aperture 48 bored therethrough. The range selection pin apertures 48 are arranged in linear alignment with one another and are located at the ends of the first/second gear linkage lever 25 and the third/fourth gear linkage lever 26 positioned above the linkage lever support rod 23. The positioning of the range selection solenoid 45 and the range selection pin mechanism 46 are such that the range selection pin 47 travels along its longitudinal axis through the range selection pin apertures 48. The overall length of the range selection pin is such that, depending upon the position of the solenoid plunger 37 of the range selection solenoid 45, the range selection drive lever 28 is linked to either the first/second gear linkage lever 25 or the third/fourth gear linkage lever 26 at any one given time. Thus, by coordinating the operation of the drive gear solenoids 35 and the range selection solenoid 45, either the first/second gear linkage lever 25 or the third/fourth gear linkage lever 26 can be driven in an axial direction about the linkage lever support rod 23.

Transmission linkage connection apertures 50 are bored through the first/second gear linkage lever 25, third/fourth gear linkage lever 26, and reverse gear linkage lever 27 at the ends thereof opposite the range selection pin apertures 48 and the reverse solenoid linkage brackets 39, respectively. The transmission linkage connection apertures 50 are intended to be pivotally connected to the manual transmission linkage (not shown), allowing the four-speed shifter 20 to control the gear shifting thereof. Linkage adjustment apertures 51 are bored through the range selection drive lever 28, first/second gear linkage lever 25, third/fourth gear linkage lever 26, and reverse gear linkage lever 27, allowing the effective length of axial travel to be modified in order to accommodate linkages of varying design.

Figure 4:
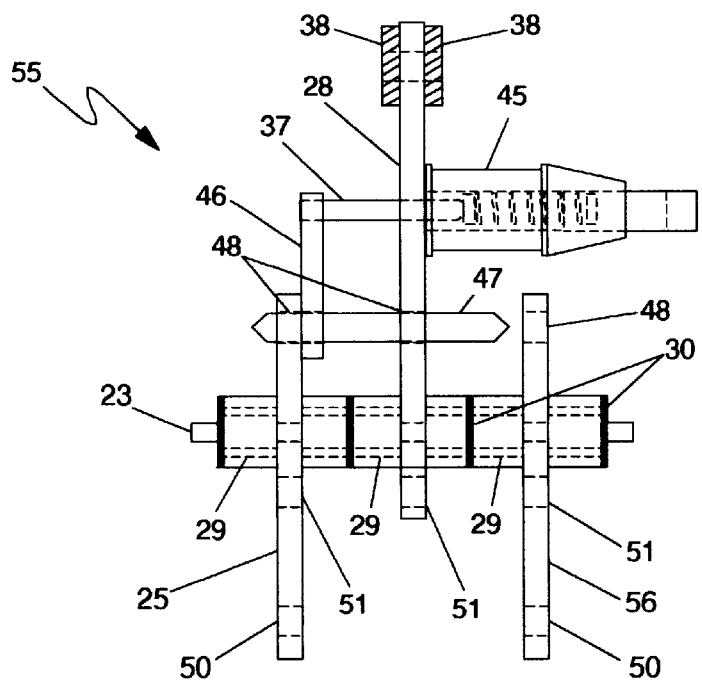
FIG. 4 is a side view of a cantilever linkage actuation mechanism for use with a three-speed manual transmission, including a reverse gear, adapted for incorporation with the configuration depicted in FIGS. 1 and 2.

Referring now to FIG. 4, depicted is a linkage actuation assembly for use with the four-speed shifter 20 in order to convert it to a three-speed shifter (not shown), hereinafter three-speed linkage assembly 55. In this configuration, the three-speed linkage assembly 55 is attached to the shifter housing 21 (not shown), replacing the four-speed linkage assembly 24. Use of this configuration eliminates the need for a separate pair of solenoids and the separate portion of the four-speed linkage assembly 24 devoted to the reverse gear, allowing the assembly to be driven by the drive gear solenoids 35 alone. Like the four-speed shifter 20, the construction of this particular embodiment is designed with the intent being to provide a permanent modification, installing a pushbutton controlled, solenoid actuated shifting mechanism that does not permit the user to manually actuate the transmission linkage via a shifting lever or the like.

The three-speed linkage assembly 55 consists of a first/second gear linkage lever 25 and a third gear/reverse linkage lever 56, and a range selection drive lever 28, rotatably attached to the linkage lever support rod 23 in a manner so as to allow them to rotate about the longitudinal axis of the linkage lever support rod 23. The first/second gear linkage lever 25 and third gear/reverse gear linkage lever 56 are positioned such that the end portions thereof protrude from the shifter housing 21. The first/second gear linkage lever 25, third gear/reverse linkage lever 56, and the range selection drive lever 28 are separated and spaced along the linkage lever support rod 23 using a series of metal bushings 29 and O-rings 30, constructed of TEFLON(™) brand floropolymer or other like friction-reducing substance.

Installed in the shifter housing 21 and replacing the four-speed linkage assembly 26, the three-speed linkage assembly 56 is actuated and operates in a manner similar to that of the four-speed shifter 20. A pair of drive gear solenoids 35 cause the actuation of the range selection drive lever 28 in the same manner used in the four-speed shifter, connecting the solenoid plunger 37 to the range selection drive lever 28 with drive solenoid linkage brackets 38.

A range selection solenoid 45 is secured to the range selection drive lever 28, at a position between the linkage lever support rod 23 and the drive solenoid linkage brackets 38, oriented such that its solenoid plunger 37 actuates in a direction perpendicular to that of the drive gear solenoids 35 and parallel to the longitudinal axis of the linkage lever support rod 23. The solenoid plunger 37 of the range selection solenoid 45 is connected to a range selection pin mechanism 46 in a manner such that the range selection pin 47, attached thereto, is actuated in a direction parallel to the longitudinal axis thereof, which coincides with and is parallel to that of the solenoid plunger 37 of the range selection solenoid 45. The first/second gear linkage lever 25, the third gear/reverse linkage lever 56, and the range selection drive lever 28 each have a range selection pin aperture 48 bored therethrough. The range selection pin apertures 48 are arranged in linear alignment with one another and are located at the ends of the first/second gear linkage lever 25 and the third gear/reverse linkage lever 56 positioned above the linkage lever support rod 23. The positioning of the range selection solenoid 45 and the range selection pin mechanism 46 are such that the range selection pin 47 travels along its longitudinal axis through the range selection pin apertures 48. The overall length of the range selection pin is such that, depending upon the position of the solenoid plunger 37 of the range selection solenoid 45, the range selection drive lever 28 is linked to either the first/second gear linkage lever 25 or the third gear/reverse linkage lever 56 at any one given time. Thus, by coordinating the operation of the drive gear solenoids 35 and the range selection solenoid 45, either the first/second gear linkage lever 25 or the third gear/reverse linkage lever 26 can be driven in an axial direction about the linkage lever support rod 23.

Transmission linkage connection apertures 50 are bored through the first/second gear linkage lever 25 and the third gear/reverse linkage lever 56 at the ends thereof opposite the range selection pin apertures 48. The transmission linkage connection apertures 50 are intended to be pivotally connected to the manual transmission linkage (not shown), allowing the three-speed shifter to control the gear shifting thereof. Linkage adjustment apertures 51 are bored through the range selection drive lever 28, first/second gear linkage lever 25, and third gear/reverse linkage lever 26, allowing the effective length of axial travel to be modified in order to accommodate linkages of varying design.

Figure 5:
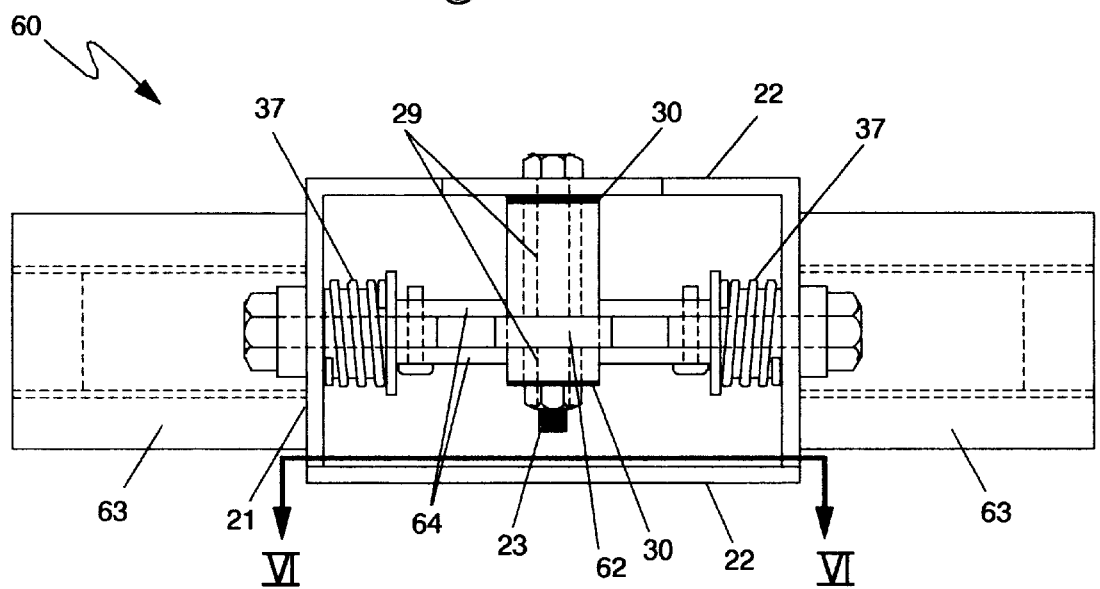
FIG. 5 is a top view of a solenoid actuated shifting mechanism for use with a motorcycle manual transmission.
Figure 6:
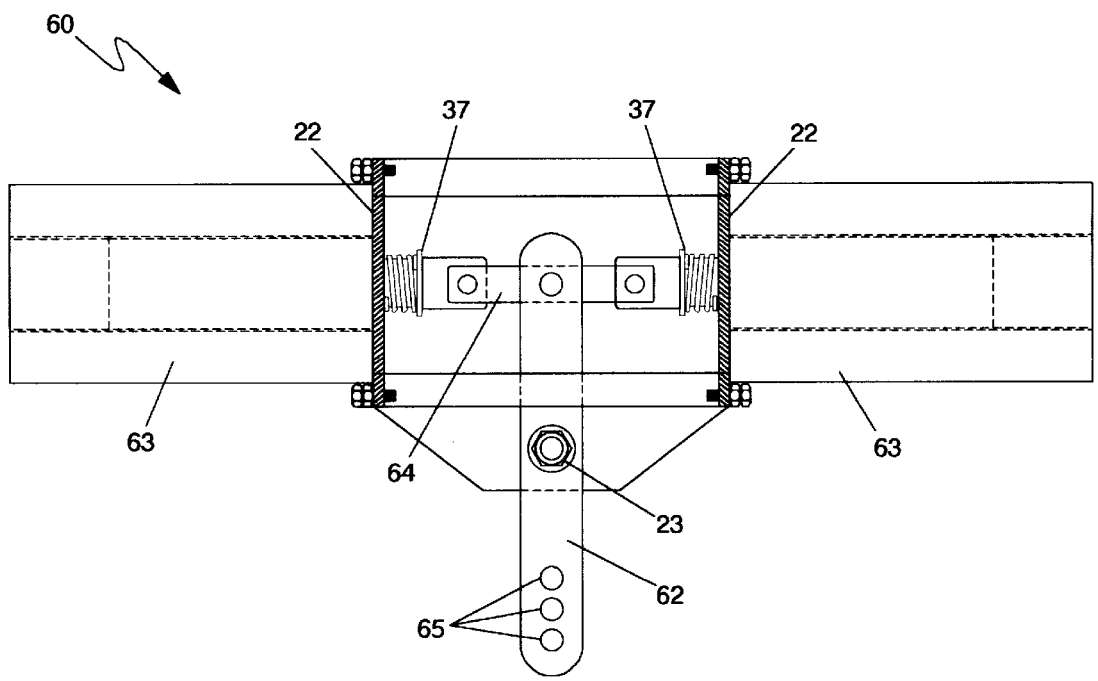
FIG. 6 is a front sectional view, taken along line VI—VI depicted in FIG. 4, of a solenoid actuated shifting mechanism for use with a motorcycle manual transmission.

Referring now to FIGS. 5–6, depicted is a solenoid actuated shifting mechanism for use with a motorcycle manual transmission or other transmission actuated by the operation of a bi-directional lever, hereinafter motorcycle shifter 60. The construction of this particular embodiment is designed with the intent being to provide either a temporary or permanent modification, installing a pushbutton controlled, solenoid actuated shifting mechanism that is adaptable to permit the user to manually actuate the transmission linkage via a shifting lever or the like. The motorcycle shifter 60 consists of a shifter housing 21, to which the various shifting components, discussed in further detail herein below, are attached and that is designed to be secured to the frame of a motorcycle or other vehicle suited with a similar engine/drive-train (not shown). The shifter housing 21 is generally rectangular in shape with two pairs of housing sidewalls 22 opposing one another and forming a hollow interior cavity therein. A linkage lever support rod 23 spans the interior cavity of the shifter housing 21 and is connected thereto, centered along one pair of the sidewalls 22 and forming the foundation upon which a motorcycle linkage assembly 61 is built. The motorcycle assembly 61 consists of a gear-actuating linkage lever 62 rotatably attached to the linkage lever support rod 23 in a manner so as to allow it to rotate about the longitudinal axis of the linkage lever support rod 23. The gear-actuating linkage lever 62 is positioned such that the end portion thereof protrudes from the shifter housing 21. The gear-actuating linkage lever 62 is spaced along the linkage lever support rod 23 using a series of metal bushings 29 and O-rings 30, constructed of TEFLON(™) brand floropolymer or other like friction-reducing substance.

A pair of gear-actuating solenoids 63 are attached to the housing sidewalls 22 in an opposing manner with the solenoid plungers 37 directed towards the interior cavity of the shifter housing 21. The gear-actuating solenoids 63 are positioned above the longitudinal axis of the linkage lever support rod 23 and operate in a direction parallel to the rotational axis of the gear-actuating linkage lever 62. The solenoid plungers 37 of the gear-actuating solenoids 63 are connected to one another by a pair of gear-actuating solenoid linkage brackets 64. The gear-actuating solenoid linkage brackets 64 are pivotally connected, at their midpoints, to the gear-actuating linkage lever 62. Configured as such, the actuation of the gear-actuating solenoids 63 will cause the actuation of the gear-actuating linkage lever 62 in an axial direction about the linkage lever support rod 23. The gear-actuating solenoid linkage brackets 64 are pivotally connected to the solenoid plungers 37, in order to take into account the vertical component of the axial motion of the gear-actuating linkage lever 62.

Shifter actuation connection apertures 65 are bored through the gear-actuating linkage lever 62 at the end gear-actuation solenoid linkage brackets 64. The shifter actuation connection apertures 65 allow for the connection thereof to the foot actuated shifting levers typically found on motorcycles and the like (not shown). The incorporation of several shifter actuation connection apertures 65 allows for adjustment by changing the effective length of axial travel to be modified in order to accommodate linkages of varying design.

Figure 7:
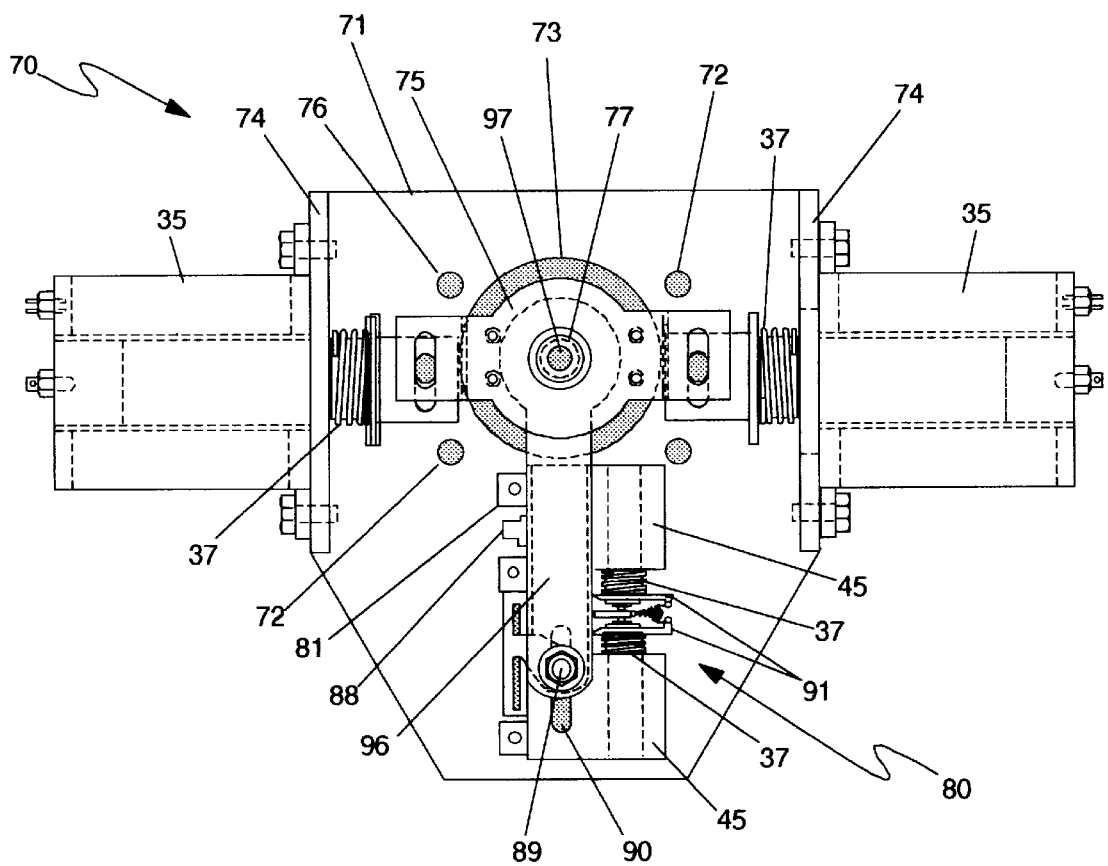
FIG. 7 is a top view of a solenoid actuated shifting mechanism for use with a five-speed or six-speed manual transmission, including a reverse gear.
Figure 8:
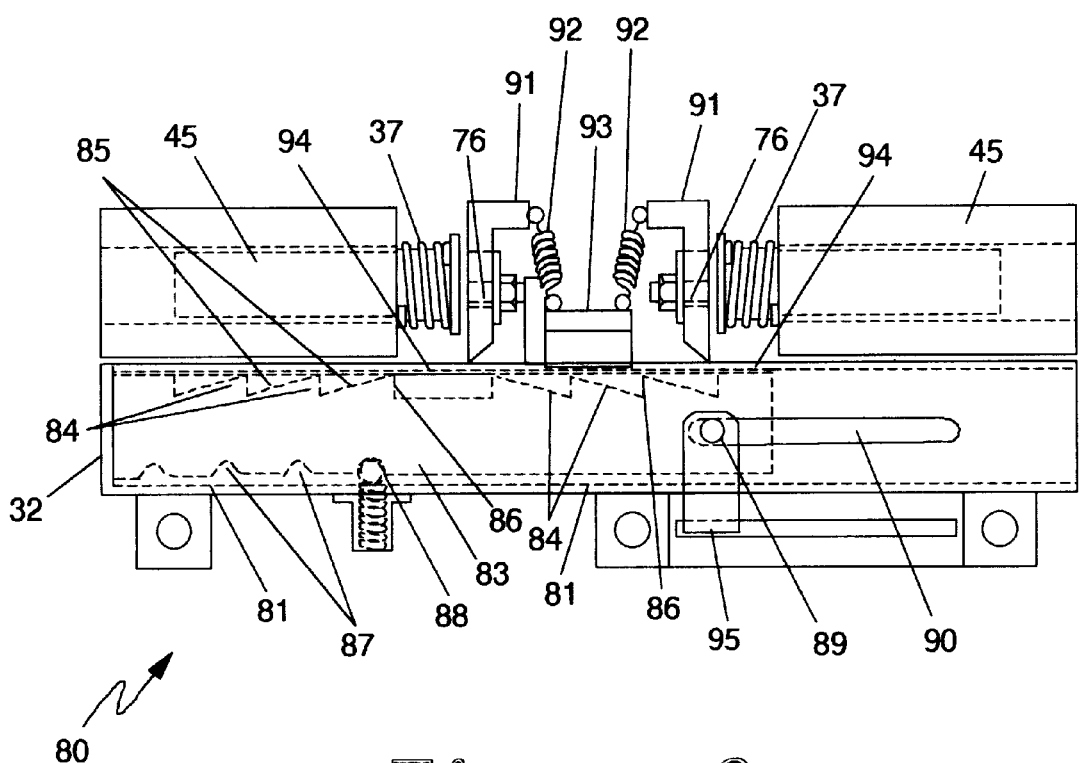
FIG. 8 is a profile view of the range selector portion of a solenoid actuated shifting mechanism for use with a five-speed or six-speed manual transmission, including a reverse gear.

Referring now to FIGS. 7–8, depicted is a solenoid actuated shifting mechanism for use with a five-speed or six-speed manual transmission, including a reverse gear, hereinafter six-speed shifter 70, according to the preferred embodiment of the present invention. The construction of this particular embodiment is designed with the intent being to provide a either a temporary or a permanent modification, installing a pushbutton controlled, solenoid actuated shifting mechanism that may or may not permit the user to manually actuate the transmission linkage via a shifting lever or the like, depending upon the chosen installation. The six-speed shifter 70 consists of a shifter mounting bracket 71, to which the various shifting components, discussed in further detail herein below, are attached and that is designed to be secured to above the shifting linkage housing of a five or six-speed manual transmission (not shown) via a series of mounting apertures 72. The shifter mounting bracket 71 has a generally flat metal plate configuration with a circular shifter aperture 73 bored therethrough. The shifter mounting bracket 71 includes a pair of drive solenoid flanges 74 that extend up from its surface on edges opposite one another. A pair of drive gear solenoids 35 are attached to the drive solenoid flanges 74 in an opposing manner with the solenoid plungers 37 directed linearly towards one another and positioned so as to aim over the center of the shifter aperture 73, parallel to the surface of the shifter mounting bracket 71. A drive linkage bracket 75 spans between the drive gear solenoids 35 and is connected to the solenoid plungers 37 thereof by a slot and pinion connector 76 that allows the drive linkage bracket 75 to slide thereon in a direction perpendicular to the direction of the drive gear solenoids 35. The drive linkage bracket 75 has a circular drive linkage shifter aperture 77 bored therethrough and located such that the center of the drive linkage shifter aperture 77 lies approximately in line with the center of the shifter aperture 73.

A gear range actuator 80 is mounted to the shifter mounting bracket 71, on the same surface as the drive gear solenoids 35, via a range actuator housing 81 secured rigidly to the shifter mounting bracket 71. The range actuator housing 81 is generally elongated and rectangular in shape and has an indexing channel 82, generally elongated and rectangular in shape, bored longitudinally therethrough. A range actuator indexing bar 83, having a generally elongated rectangular shape that coincides with the interior dimensions of the range actuator housing 81, is inserted in the indexing channel 82, resting slidably therein. A series of indexing gears 84, having a beveled gear surface 85 and a flat gear surface 86 are machined along one longitudinal edge of the range actuator indexing bar 83 and a series of four semi-spherical positioning indentations 87 are machined along and linearly arranged on the opposite edge. A spring biased positioning ball 88 is seated in the indexing channel 82 and is positioned such that, as the range actuator indexing bar 83 slides therein, the positioning ball 88 engages with the positioning indentations 87, releasably locking it in place within the range actuator housing 81. The range actuator indexing bar 83 has an indexing bar connecting pin 89 protruding therefrom that extends through an elongated connecting pin slot 90 machined in the top surface of the range actuator housing 81. Thus, as the range actuator indexing bar 83 slides within the indexing channel 82, the indexing bar connecting pin 89 slides along the connecting pin slot 90.

A pair of range selection solenoids 45 are attached to the range actuator housing 81, one on each end, in an opposing manner with the solenoid plungers 37 directed linearly towards one another along the longitudinal axis of the range actuator housing 81. Each range selection solenoid 45 has an indexing bar actuating tooth 91, with a beveled tip, attached to the solenoid plunger 37 thereof by a slot and pinion connector 76 such that they slide in a vertical direction with respect to the surface of the range actuator housing 81. Each indexing bar actuating tooth 90 has an actuating tooth biasing spring 92 connected thereto, the other end being attached to a plunger stop biasing bracket 93 attached to the range actuator housing 81. The plunger stop bracket 93 also serves to ensure that the solenoid plungers 37 come to rest at precisely the same position every time that they are de-energized. The actuating tooth biasing spring 92 serves to draw the indexing bar actuating teeth 90 toward the range actuator housing 81. A pair of elongated actuating tooth apertures 94 allow the indexing bar actuating teeth 91 to be forced into the indexing channel 82 by the actuating tooth biasing springs 92. The actuating tooth apertures 94 are offset from the length of travel of their respective solenoid plungers 37 and indexing bar actuating teeth 91. The resulting operation being that, when either range selecting solenoid 45 is actuated, the respective indexing bar actuating tooth 91 slides along the outer surface of the range actuator housing 81 until it reaches its corresponding actuating tooth aperture 94 where it is drawn therein, extending into the indexing channel 82. Once inside the indexing channel 82, the indexing bar actuating tooth 91 engages with the indexing gears 84, the flat portion of its beveled tip engaging with the flat gear surface and, as a result, the range actuator indexing bar 83 is forced to slide within the indexing channel 82 by the range selecting solenoid 45. When the range selecting solenoid 45 is de-energized, rather than causing the range actuator indexing bar 83 to slide, the beveled edge of the indexing bar actuating tooth 91 slides along the beveled gear surface 85 because the acute angle coupled with the coefficient of sliding friction between the mating surfaces prevents the force required to overcome the resistance generated by the positioning ball 88. Thus, by actuating the range selecting solenoids 45, the range actuating indexing bar 83 is made to shift between any of the four positions defined by the positioning indentations 88. Connected to the indexing bar connecting pin 89, a multi-position range indicating switch 95 is incorporated into the gear range actuator 80 for the purpose of providing positive electronic feedback indicating the current position of the range actuating indexing bar 83. An range selecting bracket 96 is connected to the indexing bar connecting pin 89, extending therefrom a distance such that is intersects with the drive linkage bracket 75. The range selecting bracket 96 has a circular range selecting shifter aperture 97 bored therethrough and located such that the center of the range selecting shifter aperture 97 lies approximately in line with the drive linkage shifter aperture 77 and the center of the shifter aperture 73.

A solenoid actuated shifting mechanism for use with an automatic transmission, hereinafter automatic shifter (not shown), is nearly identical in construction to the gear range actuator 80, the only difference being that it is a six-position device and accordingly has two more indexing gears 84 and includes six rather than four positioning indentations 87. Also, an automatic transmission linkage bracket (not shown) replaces the range selecting bracket 96. Intended for a permanent installation, the automatic shifter is mounted directly to the transmission housing.

2. Operation of the Preferred Embodiment

Figure 9:
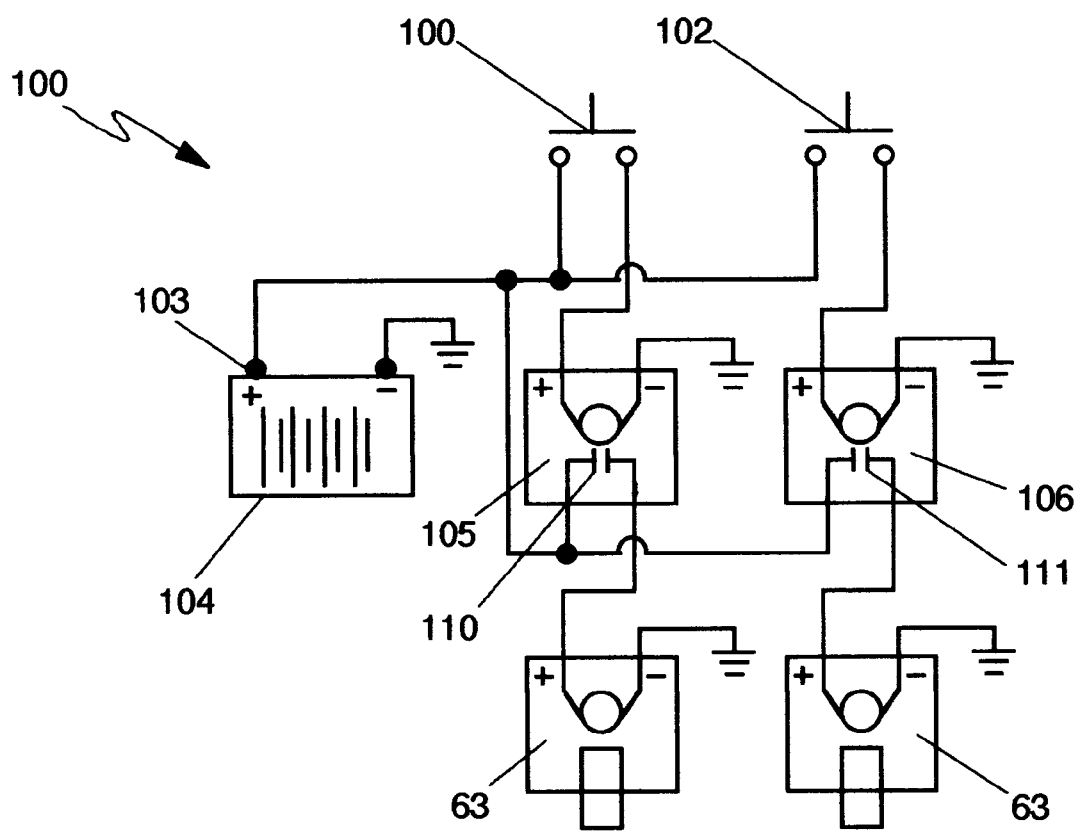
FIG. 9 is a diagrammatic view of the control circuit incorporated in a solenoid actuated shifting mechanism for use with a motorcycle manual transmission.
Figure 10:
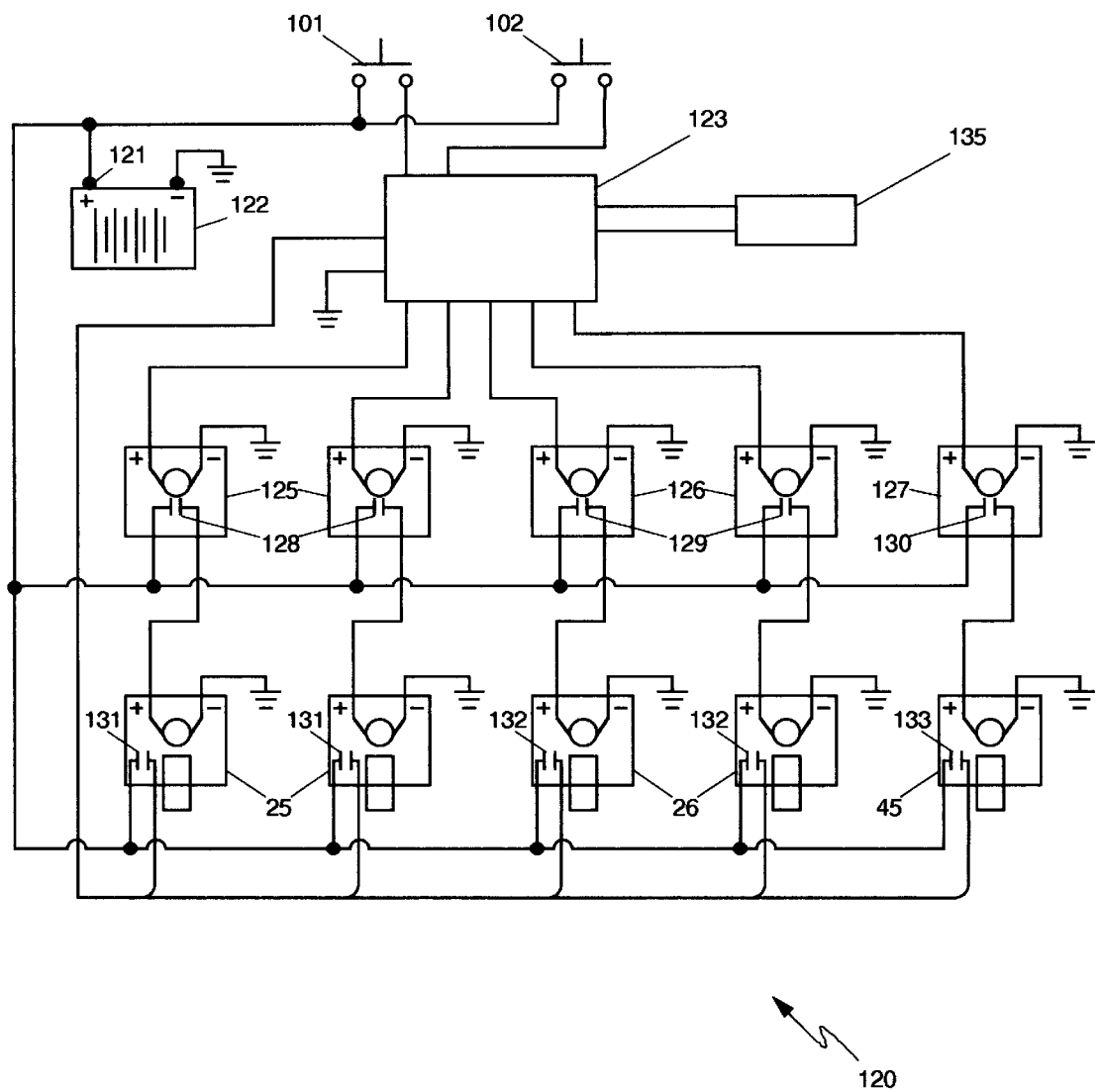
FIG. 10 is a diagrammatic view of the control circuit incorporated in a solenoid actuated shifting mechanism for use with a four-speed manual transmission, including a reverse gear.

Referring now to FIGS. 5, 6 and 9 the motorcycle shifter 60 is used in conjunction with a motorcycle shifter control circuit 100 to operate a motorcycle transmission (not shown) in the following manner: The motorcycle shifter 60 is mounted to the motorcycle frame or engine housing (not shown) oriented so that the gear-actuating linkage lever 62 lies near the motorcycle transmission foot lever (not shown). The positioning of the motorcycle shifter 60 should be such that, when actuated, the gear-actuating linkage lever 62 travels in a direction along the same rotational plane as that of the motorcycle transmission foot lever. The gear-actuating linkage lever 62 is then connected to the motorcycle transmission foot lever via the shifter actuation connection apertures 65 using standard fasteners (not shown).

The motorcycle shifter control circuit 100 consists of an upshift button 101 and a downshift button 102, mounted on the motorcycle handlebars (not shown), and connected to a positive voltage terminal 103 of the motorcycle electrical power source 104, typically a 12-volt battery. The upshift button 101 and the downshift button 102 may consist of a two-position rocker type switch so that activating both the upshift button 101 and the downshift button 102 simultaneously is prevented. When closed, the upshift button 101 and the downshift button 102 deliver power to an upshift relay 105 and a downshift relay 106, respectively. The upshift relay 105 and the downshift relay 106 are electro-mechanical relays, having a pair of upshift contacts 110 and downshift contacts 111, respectively, each of which are of the normally opened variety. Both the upshift contacts 110 and the downshift contacts 111 are wired in series with the positive voltage terminal 103 of the motorcycle electrical power source 104. Upon energizing the upshift contacts 110, power is delivered to the gear actuating solenoid 63 corresponding with the upshifting direction of the gear actuating linkage lever 62, causing the motorcycle transmission to upshift. Upon energizing the downshift contacts 111, power is delivered to the gear actuating solenoid 63 corresponding with the downshifting direction of the gear actuating linkage lever 62, causing the motorcycle transmission to downshift. Thus, the motorcycle transmission can be controlled without requiring the use of the user's foot to actuate the motorcycle transmission foot lever, although he may do so if desired.

Referring now to FIGS. 1, 2, 3 and 10 the four-speed shifter 20 is used in conjunction with a four-speed shifter control circuit 120 to operate a four-speed automobile transmission (not shown) in the following manner: The four-speed shifter 20 is mounted to the transmission linkage housing (not shown) oriented so that the first/second gear linkage lever 25, third/fourth gear linkage lever 26 and reverse gear linkage lever 27 extend into the transmission linkage housing, lining-up with the respective transmission linkages (not shown) and connecting thereto by standard fasteners (not shown).

The four-speed shifter control circuit 120 consists of an upshift button 101 and a downshift button 102, mounted on the automobile dash or steering wheel (not shown), and connected to a positive voltage terminal 121 of the automobile electrical power source 122, typically a 12-volt battery. The upshift button 101 and the downshift button 102 may consist of a two-position rocker type switch so that activating both the upshift button 101 and the downshift button 102 simultaneously is prevented. When closed, the upshift button 101 and the downshift button 102 deliver power to a computer controller 123, also wired to and powered by the automobile electrical power source 122. The computer controller 123 includes a power delivery system (not shown), consisting of switching devices such as solid-state relays, that are used to deliver power to drive gear relays 125, reverse gear relays 126 and a range selection relay 127. The drive gear relays 125, reverse gear relays 126 and a range selection relay 127 are electro-mechanical relays, having a pair of drive gear contacts 128, reverse gear contacts 129 and range selection contacts 130, respectively, each of which are of the normally opened variety. The drive gear contacts 128, reverse gear contacts 129 and range selection contacts 130 are wired to the positive voltage terminal 121 of the automobile electrical power source 122 and are used to deliver power to the drive gear solenoids 35, reverse gear solenoids 36 and the range selection solenoid 45, respectively. The drive gear solenoids 35, reverse gear solenoids 36 and the range selection solenoid 45 are equipped with drive gear feedback contacts 131, reverse gear feedback contacts 132 and range selection feedback contacts 133, respectively, each of which are of the normally opened variety. The drive gear feedback contacts 131, reverse gear feedback contacts 132 and range selection feedback contacts 133 are wired back to the computer controller 123, providing an indication of the selected transmission gear and allowing for its display on an LCD unit 135, mounted on the automobile dash.

By activating the upshift button 101 and the downshift button 102, the user requests a change in the transmission gear relative to its currently selected gear. This request is processed by the computer controller 123, which determines the appropriate solenoid or combination of solenoids to energize. The computer controller 123 then energizes the appropriate relay(s), delivering power to the respective solenoid(s) and causing the gear position to change. This change is recorded by the computer controller 123, using the feedback contacts, stored for future reference and displayed on the Liquid Crystal Display (LCD) unit 135. Thus, the automobile transmission can be controlled without requiring the use of the manual shifting lever (not shown).

Figure 11:
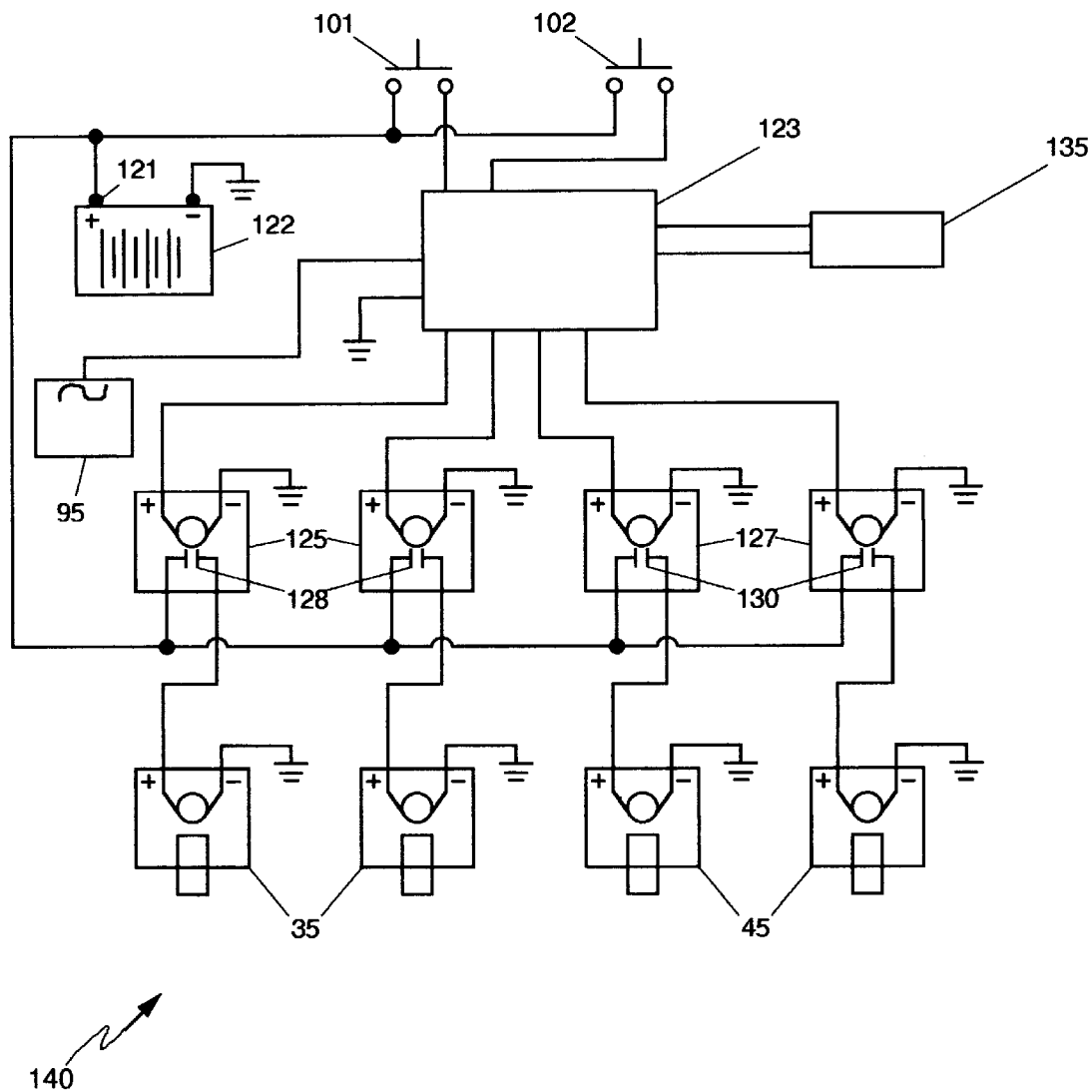
FIG. 11 is a diagrammatic view of the control circuit incorporated in a solenoid actuated shifting mechanism for use with a five-speed or six-speed manual transmission, including a reverse gear.

Referring now to FIGS. 7, 8 and 11 the six-speed shifter 70 is used in conjunction with a six-speed shifter control circuit 140 to operate a six-speed automobile transmission (not shown) in the following manner: The six-speed shifter 70 is mounted either directly to the transmission linkage housing (not shown) in a permanent manner or inside the passenger compartment. The six-speed shifter 70 will be oriented such that the transmission linkage lever (not shown) passes through the shifter aperture 73, the drive linkage shifter aperture 77 and the range selecting shifter aperture 97, allowing it to be actuated in the requisite H-pattern by the combined operations of the drive gear solenoids 35 and the range selection solenoids 45.

The six-speed shifter control circuit 140 consists of an upshift button 101 and a downshift button 102, mounted on the automobile dash or steering wheel (not shown), and connected to a positive voltage terminal 121 of the automobile electrical power source 122, typically a 12-volt battery. The upshift button 101 and the downshift button 102 may consist of a two-position rocker type switch so that activating both the upshift button 101 and the downshift button 102 simultaneously is prevented. When closed, the upshift button 101 and the downshift button 102 deliver power to a computer controller 123, also wired to and powered by the automobile electrical power source 122. The computer controller 123 includes a power delivery system (not shown), consisting of switching devices, such as solid-state relays, that are used to deliver power to drive gear relays 125 and range selection relays 127. The drive gear relays 125 and range selection relays 127 are electro-mechanical relays, each having a pair of drive gear contacts 128 and range selection contacts 130, respectively, each of which are of the normally opened variety. The drive gear contacts 128, and range selection contacts 130 are wired to the positive voltage terminal 121 of the automobile electrical power source 122 and are used to deliver power to the drive gear solenoids 35 and the range selection solenoids 45, respectively. The multi-position range indicating switch 95 is wired to the computer controller 123, providing an indication of the selected transmission gear and allowing for its display on an LCD unit 135, mounted on the automobile dash.

By activating the upshift button 101 and the downshift button 102, the user requests a change in the transmission gear relative to its currently selected gear. This request is processed by the computer controller 123, which determines the appropriate solenoid or combination of solenoids to energize. The computer controller 123 then energizes the appropriate relay(s), delivering power to the respective solenoid(s) and causing the gear position to change. This change is recorded by the computer controller 123, using the feedback provided by the multi-position range indicating switch 95, stored for future reference and displayed on the LCD unit 135. Thus, the automobile transmission can be controlled without requiring the use of the manual shifting lever (not shown), although the user is not prevented from doing so.

Figure 12:
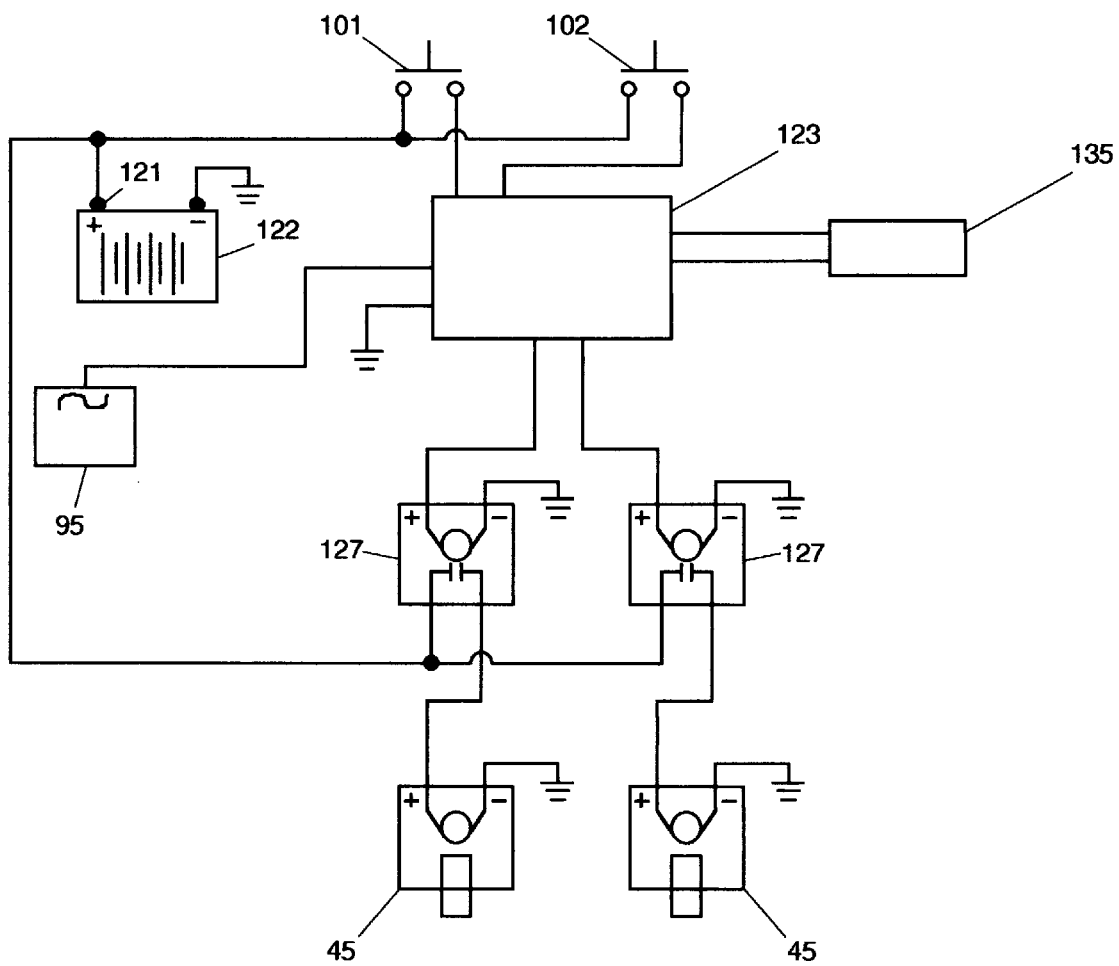
FIG. 12 is a diagrammatic view of the control circuit incorporated in a solenoid actuated shifting mechanism for use with an automatic transmission.

Referring now to FIGS. 8 and 12 an automatic transmission shifter (not shown) is used in conjunction with an automatic transmission shifter control circuit 145 to operate an automatic automobile transmission (not shown) in the following manner: The automatic transmission shifter is mounted directly to the transmission housing (not shown) in a permanent manner. The automatic transmission linkage bracket (not shown) connects directly to the automatic transmission gear selector arm (not shown) such that it will be actuated by the operation of the range selection solenoids 45.

The automatic shifter control circuit 145 consists of an upshift button 101 and a downshift button 102, mounted on the automobile dash or steering wheel (not shown), and connected to a positive voltage terminal 121 of the automobile electrical power source 122, typically a 12 volt battery. The upshift button 101 and the downshift button 102 may consist of a two-position rocker type switch so that activating both the upshift button 101 and the downshift button 102 simultaneously is prevented. When closed, the upshift button 101 and the downshift button 102 deliver power to a computer controller 123, also wired to and powered by the automobile electrical power source 122. The computer controller 123 includes a power delivery system (not shown), consisting of switching devices, such as solid-state relays, that are used to deliver power to range selection relays 127. The range selection relays 127 are electro-mechanical relays, having a pair of range selection contacts 130, each of which are of the normally opened variety. The range selection contacts 130 are wired to the positive voltage terminal 121 of the automobile electrical power source 122 and are used to deliver power to the range selection solenoids 45. The multi-position range indicating switch 95 is wired to the computer controller 123, providing an indication of the selected transmission gear and allowing for its display on an LCD unit 135, mounted on the automobile dash.

By activating the upshift button 101 and the downshift button 102, the user requests a change in the transmission gear relative to its currently selected gear. This request is processed by the computer controller 123, which determines the appropriate solenoid to energize. The computer controller 123 then energizes the appropriate relay, delivering power to the respective solenoid and causing the gear position to change. This change is recorded by the computer controller 123, using the feedback provided by the multi-position range indicating switch 95, stored for future reference and displayed on the LCD unit 135. Thus, the automobile transmission can be controlled without requiring the use of the manual shifting lever (not shown), although the user is not prevented from doing so.

While the preferred embodiments of the invention have been shown, illustrated and described, it will be apparent to those skilled in this field that various modifications may be made in these embodiments without departing from the spirit of the present invention or the teachings of the present disclosure. For example, it is envisioned that the preferred embodiments can be modified to allow for other machine operations that typically require the use of both hands, such as heavy construction machinery, where several control levers could be replaced with a single joystick connected to a multi-position electrical switch that would energize a series of solenoids connected to the hydraulic valves. It is for this reason that the scope of the invention is set forth in and is to be limited only by the following claims.

What is claimed is:

1. A pushbutton solenoid shifter for actuating the linkage levers of a manual transmission, said solenoid shifter comprising:

a shifter housing comprised of first and second pairs of opposing sidewalls configured in a generally rectangular shape and forming a hollow interior space;

a lever support rod connected to said first opposing sidewall pair and spanning across said hollow interior space;

at least one linkage lever rotatably connected to said lever support rod and having a solenoid end extending above said lever support rod and a linkage end extending below said lever support rod; and at least one lever actuating solenoid connected to the exterior of at least one of said second pair of opposing sidewalls and having a solenoid plunger operable between an extended position and a retracted position, said solenoid plunger pivotally connected to said solenoid end;

wherein the operation of said lever actuating solenoids cause said linkage lever to travel in arcuate path about the longitudinal axis of said lever support rod.

2. The solenoid shifter of claim 1 further comprising:

mounting and connecting means for affixing said solenoid shifter to a conventional manual transmission, wherein said mounting and connecting means further pivotally attaches to said linkage levers.

3. The solenoid shifter of claim 2 further comprising a pushbutton activation means having an upshift position and a downshift position, said pushbutton activation means connected electrically in series with said lever actuating solenoids.

4. A pushbutton solenoid shifter for actuating the linkage levers of a manual transmission, said solenoid shifter comprising:

a shifter housing comprised of first and second pairs of opposing sidewalls configured in a generally rectangular shape and forming a hollow interior space;

a lever support rod connected to said first opposing sidewall pair and spanning across said hollow interior space;

first and second drive gear linkage levers rotatably connected to said lever support rod and having a solenoid end extending above said lever support rod and a linkage end extending below said lever support rod;

a reverse gear linkage lever rotatably connected to said lever support rod and having a solenoid end extending above said lever support rod and a linkage end extending below said lever support rod;

a main linkage lever rotatably connected to said lever support rod and having a solenoid end extending above said lever support rod and a linkage end extending below said lever support rod;

a reverse gear lever actuating solenoid connected to the exterior of at least one of said second pair of opposing sidewalls and having a solenoid plunger operable between an extended position and a retracted position, said solenoid plunger pivotally connected to said solenoid end of said reverse gear linkage lever;

a main lever actuating solenoid connected to the exterior of one of said second pair of opposing sidewalls and having a solenoid plunger operable between an extended position and a retracted position, said solenoid plunger pivotally connected to said solenoid end of said main linkage lever; and a drive lever selection solenoid affixed to said solenoid end of said main linkage lever, said linkage lever selection solenoid having a solenoid plunger operable between an extended position and a retracted position and connected to a lever selection pin.

5. The solenoid shifter of claim 4 wherein the operation of said drive lever selection solenoid to said extended position causes said lever selection pin to pass through a selection pin aperture in said solenoid end of said first drive gear linkage lever causing a mechanical attachment to said main linkage lever, and the operation of said drive lever selection solenoid to said retracted position causes said lever selection pin to pass through a selection pin aperture in said solenoid end of said second drive gear linkage lever causing a mechanical attachment to said main linkage lever.

6. The solenoid shifter of claim 5 wherein the operation of said main lever actuating solenoid causes said solenoid plunger to operate between said extended position and said retracted position and causing said first linkage lever to travel in arcuate path about the longitudinal axis of said lever support rod when said drive lever selection solenoid is in said extended position.

7. The solenoid shifter of claim 6 wherein the operation of said main lever actuating solenoid causes said solenoid plunger to operate between said extended position and said retracted position and causing said second linkage lever to travel in arcuate path about the longitudinal axis of said lever support rod when said drive lever selection solenoid is in said retracted position.

8. The solenoid shifter of claim 7 wherein the operation of said reverse gear lever actuating solenoid causes said solenoid plunger to operate between said extended position and said retracted position and causing said reverse gear linkage lever to travel in arcuate path about the longitudinal axis of said lever support rod.

9. The solenoid shifter of claim 8 further comprising a pushbutton activation means having an upshift position and a downshift position, said pushbutton activation means connected electrically in series with said lever actuating solenoids.

10. A pushbutton solenoid shifter for actuating the shifting rod of a manual transmission in a conventional H-pattern, said solenoid shifter comprising:

a housing having a bottom plate and a first sidewall opposite a second sidewall, said first and second sidewalls extending vertically from said bottom plate, said housing having a shifting rod aperture bored through said bottom plate;

at first gear selection solenoid affixed to said first sidewall and a second gear selection solenoid affixed to said second sidewall in an opposing fashion, said gear selection solenoids each having a solenoid plunger operable between an extended position and a retracted position;

a gear selection bracket having a first end slidably connected to said first gear selection solenoid plunger and a second end slidably connected to said second gear selection solenoid plunger, said gear selection bracket capable of linear displacement in a direction perpendicular to the travel of said gear selection solenoid plungers, said gear selection bracket having a shifting rod aperture bored therethrough;

a range selection actuator affixed to the surface of said base plate and having a pair of range selection solenoids that actuate an indexing means that is slidably operable between at least two fixed linear positions;

a range selection bracket pivotally affixed to said range selection actuator, extending beneath said gear selection bracket and having a shifting rod aperture bored therethrough, said shifting rod aperture coinciding and in vertical linear alignment with said gear selection bracket shifting rod aperture and said base plate shifter rod aperture;

wherein the operation of said gear selection solenoids cause said gear selection bracket to travel in a linear direction and the operation of said indexing mechanism causes said range selection bracket to travel in a linear direction perpendicular to that of said gear selection bracket.

11. The solenoid shifter of claim 10 further comprising mounting means for affixing said solenoid shifter to a shifting rod, passing said shifting rod through said bottom plate shifting rod aperture, said gear selection bracket shifting rod aperture and said range selection bracket shifting rod aperture.

* * * * *